United States Patent [19]

Schermutzki et al.

[11] Patent Number: 5,445,108
[45] Date of Patent: Aug. 29, 1995

[54] PROCESS AND APPARATUS FOR THE CRYSTALLIZATION OF A MELT

[75] Inventors: Konrad Schermutzki, Remseck; Herbert Würmseher, Meitingen, both of Germany

[73] Assignee: Santrade Ltd., Luzern, Switzerland

[21] Appl. No.: 118,605

[22] Filed: Sep. 10, 1993

Related U.S. Application Data

[60] Division of Ser. No. 40,586, Mar. 31, 1993, Pat. No. 5,269,817, which is a continuation of Ser. No. 804,599, Dec. 10, 1991, abandoned.

[30] Foreign Application Priority Data

Dec. 22, 1990 [DE] Germany ............... 40 41 670.4

[51] Int. Cl.⁶ .............................................. C30B 35/00
[52] U.S. Cl. .................................... 117/200; 117/208; 117/913; 422/245.1; 422/254
[58] Field of Search ............... 422/245, 254, 245.1; 117/913, 208, 200; 23/295 R

[56] References Cited

U.S. PATENT DOCUMENTS

| | | | |
|---|---|---|---|
| 1,530,398 | 3/1925 | Oliver | 422/254 |
| 2,904,412 | 9/1959 | McBride et al. | 23/302 |
| 3,010,802 | 11/1961 | Schenk et al. | 23/293 R |
| 3,011,878 | 12/1961 | Lackey et al. | 23/293 R |
| 3,405,209 | 10/1968 | Aagaard et al. | 264/144 |
| 3,621,664 | 11/1971 | Saxer . | |
| 3,885,920 | 5/1975 | Ellithorpe et al. | 422/254 |
| 4,443,412 | 4/1984 | Schermutzki et al. | 422/254 |
| 4,555,280 | 11/1985 | Levinthal | 149/109.6 |
| 5,269,817 | 12/1993 | Schermutzki et al. | 23/295 R |
| 5,326,541 | 7/1994 | Ulrich et al. | 422/254 |

FOREIGN PATENT DOCUMENTS 2182168 12/1973 France .
1193474 5/1965 Germany .

*Primary Examiner*—Robert Kunemund
*Attorney, Agent, or Firm*—Burns, Doane, Swecker & Mathis

[57] ABSTRACT

A melt is crystallized by introducing the melt into a gap formed between two belts. The gap-forming flights of the belts travel in opposite directions. An upper one of the flights is cooled so that an upper surface of the melt crystallizes thereon and is removed from the gap on the upper belt. The lower belt removes the residual melt from the gap and that residual melt is recycled to the gap.

12 Claims, 1 Drawing Sheet

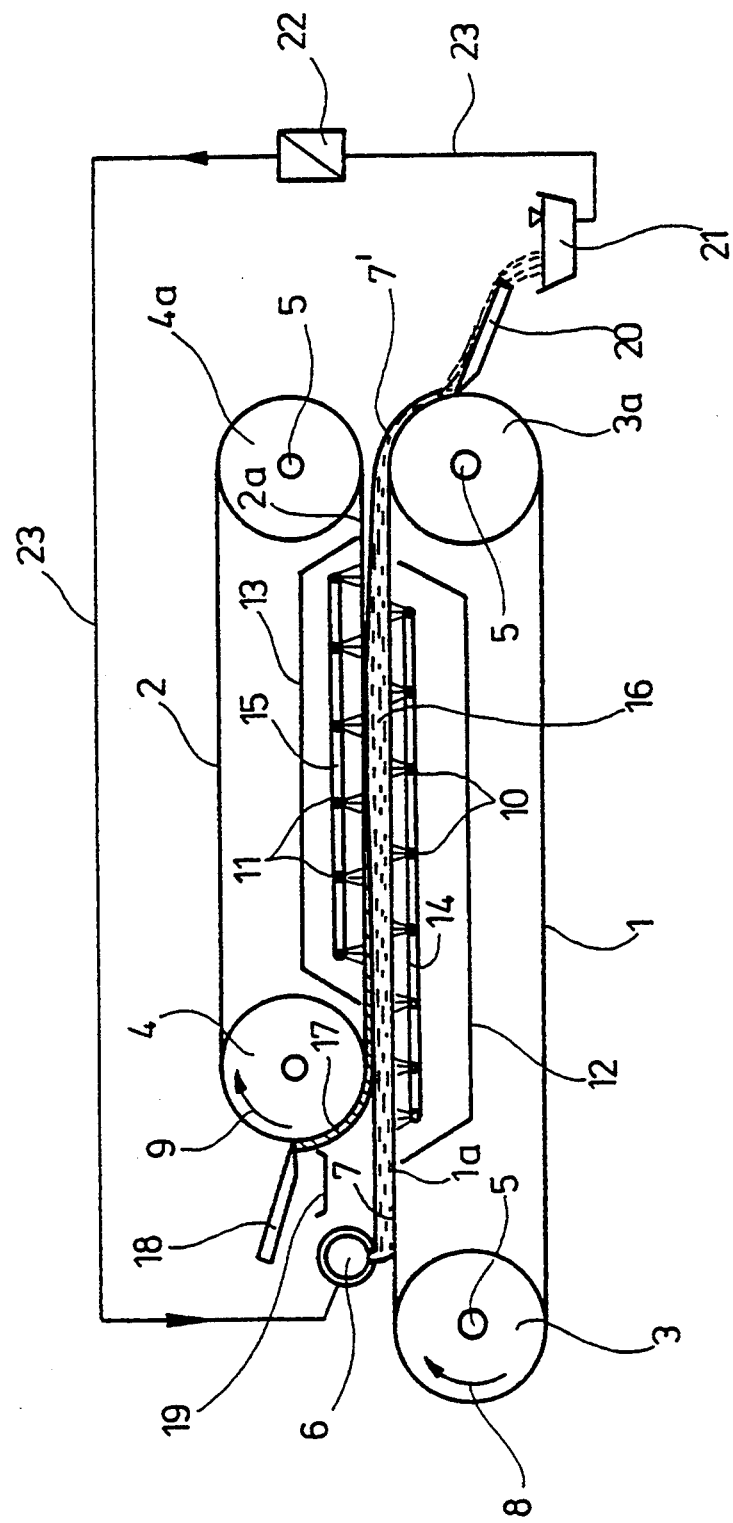

PROCESS AND APPARATUS FOR THE CRYSTALLIZATION OF A MELT

This is a Division of application Ser. No. 08/040,586, filed Mar. 31, 1993, now U.S. Pat. No. 5,269,817 which is a Continuation of application Ser. No. 07/804,599 filed Dec. 10, 1991 now abandoned.

BACKGROUND OF THE INVENTION

The invention concerns a process and an apparatus for the crystallization of melts, wherein at least one wall coolable to a temperature below the crystallization point of the melt is provided, the wall being in contact with the melt so that crystallization takes place on it.

Processes and apparatus are known (e.g., see Swiss Patent 501,421) wherein crystals are formed by the extraction of heat from the melt of a chemical product. In the known processes and apparatuses, tubular crystallizers are used, wherein a melt and a coolant run down along internal and external walls thereof, respectively, in the form of trickling films, so that the desired crystallization takes place. The crystallization is induced for the purpose of solidifying a melt or purifying a chemical product.

The purifying process is based upon the fact that crystals are purer than the initial melt. Thus, by carrying out the above-described crystallizing process, impurities can be pressured against the grain boundaries upon the formation of crystals, so that the impurities remain in the residual melt. The known processes and configurations operate discontinuously. Initially, the melt is caused to crystallize on the cooled walls of the crystallizers. Afterwards, the crystalline layer is melted and runs down the walls.

It is an object of the present invention to develop a process and an apparatus of the above-mentioned type so that it is no longer necessary to work discontinuously, but rather so that a continuous recovery of the crystallized product is possible.

SUMMARY OF THE INVENTION

To attain this object, initially in a process of the aforementioned type two walls moving in opposite directions are provided one of which walls is supplied with the melt, while the other wall is a cooled wall brought into contact with a surface of the melt. That surface of the melt crystallizes on that other wall and is continuously drawn off therewith to be further processed.

Preferably, the cooled wall carrying the melt is at a temperature in the vicinity of the crystallization point, whereby the melt surface in contact with the cooled wall crystallizes very rapidly.

An apparatus according to the invention wherein the walls are formed by two endless belts defining a gap between two opposing flights thereof. The flights travel in different directions. The melt is applied to one flight and travels thereon into the gap. The other flight is cooled and is in contact with an opposing surface of the melt to crystallize that surface. The crystallized layer leaves the gap on the cooled belt and is removed therefrom.

Preferably, the cooled belt constitutes an upper one of the belts, and the lower belt is heated. A scraper or the like removes residual melt from the lower belt. The residual melt can be remelted and re-fed to the gap. The belts can be heated and cooled by sprayers which spray hot or cold liquid thereagainst.

BRIEF DESCRIPTION OF THE DRAWINGS

The objects and advantages of the invention will become apparent from the following detailed description of a preferred embodiment thereof in connection with the accompanying drawings in which like numerals designate like elements, and in which:

The Sole FIGURE shows schematically in side elevation an apparatus for carrying out the process, according to the invention.

DETAILED DESCRIPTION OF A PREFERRED EMBODIMENT OF THE INVENTION

The apparatus comprises a double belt installation, including a lower belt i and an upper belt 2, which are guided around reversing rolls 3, 3a and 4, 4a. The axles 5 of the reversing rolls 3, 3a, 4, 4a are horizontal. The belts 1, 2 may comprise steel bands. The lower belt I is somewhat longer than the upper belt 2 and its upper flight 1a projects upstream past the reversing roll 4 of the upper belt 2. Disposed above that upstream portion of the flight 1a is a feeder device 6 for feeding a melt 7 produced by the melting of a material capable of crystallization. The feeder device 6 may comprise a feeder pipe with a slit in its bottom side extending transversely to the running direction 8 of the lower belt 1. However, a known strip caster or means to apply the melt in the form of drops, may also be used.

The upper belt 2 revolves in a direction 9 (i.e., clockwise in the FIGURE) which is the same as that of the lower belt. The flight 1a of the lower band and the lower flight 2a of the upper band form a parallel gap therebetween, and those flights travel in opposite directions.

Within areas surrounded by the belts 1, 2, respectively, are disposed spraying devices comprising a plurality of spray nozzles 10 and 11. The spraying devices are located within a cover 12 and 13 in a manner such that the upper flight 1a of the lower belt 1 is sprayed from below, and the lower flight 2a of the upper belt 2 is sprayed from above. A liquid is supplied to the lower spray nozzles 10 through conduit system 14, and a liquid is supplied to the spray nozzles 1 by means of a conduit system 15. Those conduit systems 14, 15 are connected in a manner (not shown in detail) with a fluid circulation system laterally relative to the endless belts.

The liquid supplied to the conduit system 14 is maintained at a temperature in the vicinity of, but preferably slightly higher than, the crystallization temperature of the melt 7. The conduit system 15, on the other hand, is supplied with a cooling liquid whose temperature is substantially below the crystallization temperature of the melt 7.

The spraying liquids thus impact against the sides of the respective belts 2 and 1 facing away from the gap 16 in which the melt 7 is located in order to add heat to, or remove heat from, the melt 7 in the gap. That is, the liquid sprayed against the upper strand 1a of the lower belt, maintains at a predetermined temperature the surface of the melt contacting the flight 1a, while the surface of the melt 7 in contact with the lower flight 2a of the upper belt 2 is strongly cooled within the gap 16 by means of the liquid sprayed from nozzles 11. Thus, on the lower flight 2a of the upper belt beginning in an area upstream of the reversing roll 4a, a crystallization layer 17 will be formed from the melt 7, which layer is moved out of the gap 16 in the traveling direction 9 of the upper belt 2a, i.e., to the left in the figure, opposite the direction of feeding of the melt. The crystallization layer 17, which continues to adhere to the upper belt 2 outside of the gap, is removed from the belt 2 by means of a take-off deice 18, for example a stripping blade and is placed on a conveyor 19 capable of moving the crystalline layer. The crystalline layer 17 crumbles upon being taken off the belt and is transported laterally out of the range of the revolving belts i and 2 for further processing.

The reversing roll 3a of the lower belt 1 is combined with a stripping deice 20, for example in the form of a spatula or the like, whereby the residual melt 7' is removed from the terminal area of the lower belt 1 and passed into a collector device 21. From this collector deice 21 the melt enters a recycle line 23 and is transported to the feeder device 6 through a heat exchanger 22 which remelts and heats the melt to the initial feeding temperature. It would also be possible to equip the collector deice 21 itself with a heat exchanger in order to recycle the residual melt. The apparatus described with reference to the drawing renders possible the continuous production of crystals for further processing.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. Apparatus for the crystallization of a melt comprising first and second endless belts presenting respective first and second oppositely facing flights forming a gap therebetween, feeding means for feeding a melt into said gap, drive means for rotating said belts such that said flights thereof travel in relatively opposite directions, and means for maintaining said first flight at a temperature lower than a crystallization temperature of said melt so that a surface of said melt contacting said first flight crystallizes thereon and is removed from said gap upon said first flight.

2. Apparatus according to claim 1 including means for maintaining said second flight at a temperature no lower than said crystallization temperature, said second flight conveying residual melt from said gap.

3. Apparatus according to claim 2, wherein said first flight is located above said second flight, a portion of said second flight extending beyond said first flight in a direction opposite a direction of travel of said second flight, said feeding means arranged to feed the melt onto said portion of said second belt.

4. Apparatus according to claim 3 including reversing rolls about which each of said belts rotates, each of said reversing rolls being rotatable about a horizontal axis.

5. Apparatus according to claim 3 including a take-off means arranged outside of said gap for removing crystallized melt from said second flight.

6. Apparatus according to claim 5, wherein said take-off means comprises a scraper blade.

7. Apparatus according to claim 2 including means disposed outside of said gap for removing residual melt from said second belt.

8. Apparatus according to claim 2, wherein said means for maintaining the temperature of said second flight includes heating means for heating said first flight from below.

9. Apparatus according to claim 8, wherein said heating means sprays heated liquid.

10. Apparatus according to claim 2, wherein said means for maintaining the temperature of said first flight comprises cooling means for cooling said first flight from above.

11. Apparatus according to claim 10, wherein said cooling means sprays cooled liquid.

12. Apparatus according to claim 1 including means for removing residual melt from said second flight, means for remelting said removed residual melt, and means for conducting said remelted residual melt to said feeding means.

* * * * *